United States Patent [19]
Golder

[11] Patent Number: 5,731,380
[45] Date of Patent: Mar. 24, 1998

[54] ELASTOMERIC COMPOSITIONS

[75] Inventor: Michael D. Golder, Allendale, N.J.

[73] Assignee: Hoechst Celanese Corporation, Warren, N.J.

[21] Appl. No.: 827,790

[22] Filed: Apr. 11, 1997

[51] Int. Cl.[6] .................................................. C08L 67/02
[52] U.S. Cl. .................... 525/64; 528/272; 528/300; 528/301; 528/302; 528/308; 528/308.6; 525/66; 525/92; 525/131; 525/148; 525/173; 525/437; 525/440; 525/445
[58] Field of Search ...................................... 528/272, 300, 528/301, 302, 308, 308.6; 525/64, 66, 92, 131, 148, 173, 437, 440, 445

[56] References Cited

U.S. PATENT DOCUMENTS

| | | | |
|---|---|---|---|
| 4,179,479 | 12/1979 | Carter, Jr. | 525/66 |
| 4,284,734 | 8/1981 | Chaney | 525/92 |
| 4,317,890 | 3/1982 | Goyert et al. | 525/66 |
| 4,508,870 | 4/1985 | Dufour et al. | 525/64 |
| 4,992,506 | 2/1991 | McCormick et al. | 524/513 |
| 5,112,915 | 5/1992 | Morelli et al. | 525/166 |
| 5,149,589 | 9/1992 | Naritomi et al. | 428/412 |
| 5,179,163 | 1/1993 | Golder | 525/166 |
| 5,216,062 | 6/1993 | Lausberg et al. | 524/404 |
| 5,219,933 | 6/1993 | Henton et al. | 525/66 |
| 5,237,000 | 8/1993 | Lausberg et al. | 525/64 |
| 5,237,001 | 8/1993 | Piejko et al. | 525/66 |
| 5,252,665 | 10/1993 | Chiolle et al. | 525/64 |
| 5,308,894 | 5/1994 | Laughner | 523/436 |
| 5,356,991 | 10/1994 | Chiolle et al. | 525/66 |

Primary Examiner—Samuel A. Acquah
Attorney, Agent, or Firm—Karen E. Klumas

[57] ABSTRACT

An elastomeric composition comprising:

(A) a polyester elastomer;

(B) a thermoplastic polyurethane elastomer; and (C) a multiphase composite interpolymer comprising an elastomeric first phase, a final rigid thermoplastic phase and, optionally, one or more intermediate phases, wherein components (A) and (B) combined are present in the composition in an amount of from about 55 to about 90 percent by weight, based on the total weight of components (A), (B) and (C); and wherein the ratio by weight of component (A) to component (B) is from about 1:5 to about 8:1.

21 Claims, No Drawings

ELASTOMERIC COMPOSITIONS

BACKGROUND OF THE INVENTION

1. Field of the Invention

The field of art to which this invention relates is thermoplastic elastomeric compositions.

2. Description of the Prior Art

A variety of thermoplastic elastomeric compositions are disclosed in the art. Blends of polyester elastomers and one or more impact modifiers are described, for example, in U.S. Pat. No. 5,179,163 (disclosing blends of a thermoplastic elastomer and an ethyl acrylate copolymer); U.S. Pat. No. 5,112,915 (disclosing blends of a rubbery interpolymer comprising a crosslinked (meth) acrylate rubbery phase and an interpenetrating, crosslinked styrenic phase); and U.S. Pat. No. 4,508,870 (disclosing blends of a thermoplastic elastomer and a graft polymer of from 20 to 40 parts by weight of a monomer selected from the group consisting of methyl methacrylate and acrylonitrile and 80 to 60 parts by weight of vinyl aromatic monomer).

Blends of thermoplastic polyurethane elastomers with one or more graft rubbers are also known in the art. For example, U.S. Pat. No. 5,237,000 discloses impact modified molding materials containing from 30 to 90 parts by weight of at least one thermoplastic polyurethane elastomer, from 5 to 65 parts by weight of at least one thermoplastic polyester, and from 5 to 30 parts by weight of a graft rubber; U.S. Pat. No. 5,237,001 describes a thermoplastic composition comprising a thermoplastic polyurethane and an at least partly crosslinked alkyl acrylate polymer; U.S. Pat. No. 4,179,479 discloses a thermoplastic composition comprising (a) 40 to 99% by weight of a thermoplastic polyurethane, (b) from 1 to 60% by weight of a thermoplastic polymer selected from a group of materials which includes acrylonitrile/butadiene/styrene graft copolymers, and (c) from 0.5 to 10% by weight based on the weight (a) and (b) of a processing aid as therein described; U.S. Pat. No. 5,216,062 discloses molding compositions composed of 20 to 90 percent by weight of a thermoplastic polyurethane, 1 to 40 percent by weight of an elastomeric graft copolymer and 5 to 75 percent by weight of a copolymer formed from (a) α-methylstyrene and (b) acrylonitrile, methacrylonitrile, or mixtures thereof; and U.S. Pat. No. 4,317,890 describes a thermoplastic synthetic material comprising 75 to 97% by weight of a thermoplastic polyurethane and 25 to 3% by weight of a polymer of an olefinic graft polymer.

Blends containing thermoplastic urethane elastomers and polyester elastomers are also described in the art. See, for example, U.S. Pat. No. 5,149,589 claiming a thermoplastic elastomer composition which is fusion bonded to a molded synthetic resin to form a composite molded product, wherein said thermoplastic elastomer composition comprises:

(1) 100 parts by weight of a thermoplastic elastomer selected from the group consisting of a hydrogenated SBS block copolymer, olefin elastomer, diene elastomer and urethane elastomer, and (2) 25 to 185 parts by weight of a thermoplastic polyester elastomer;

and U.S. Pat. No. 5,356,991 describing blends of 55 to 98% by weight of polybutylene terephthalate, from 1 to 35% by weight of a butadiene rubber, from 1 to 10% by weight of a block copolyester elastomer, and from 1 to 25% by weight of a polycarbonate or thermoplastic polyurethane.

Elastomeric compositions are commonly used in applications where flexibility and ductility are required, for example, the production of parts designed to recover from repeated stretching or compression forces. In general, the more elastomeric a composition, the lower its degree of crystallinity. Many highly elastic materials, for example, acrylate or butadiene rubbers, lack a defined crystalline structure. These amorphous rubbers may not, however, match the performance of partially crystalline materials such as polyester elastomers or elastomeric polyurethanes, in applications requiring greater strength or higher use temperatures.

Polyester elastomers and elastomeric polyurethanes are frequently able to withstand higher processing and/or use temperatures than amorphous rubbers. Factors which affect the processability of polyester elastomers and elastomeric polyurethanes include their crystallization temperatures and rates. Materials crystallizing at lower temperatures and slower rates may require longer residence times before they can be ejected from a mold without deforming. Additionally, materials that crystallize at slower rates oftentimes exhibit a greater degree of post-molding dimensional change than faster crystallizing materials. Crystallization temperatures and rates are subject to variation depending upon the composition and relative amounts of what are generally referred to as the "hard" and "soft" segments of these elastomers. In general, as the degree of crystallinity of such materials increases, elastic recovery decreases.

SUMMARY OF THE INVENTION

It has now been found that a polyester elastomer, an elastomeric polyurethane also termed a "TPU" or thermoplastic polyurethane elastomer, and a multiphase composite interpolymer can be combined to provide a composition having a desirable combination of elastomeric properties and material processability. Moreover, such compositions are typically found to have crystallization temperatures significantly higher than either the polyester elastomer or polyurethane components thereof. Accordingly, this invention relates to an elastomeric composition comprising:

(A) a polyester elastomer;

(B) a thermoplastic polyurethane elastomer; and (C) a multiphase composite interpolymer comprising an elastomeric first phase, a final rigid thermoplastic phase and, optionally, one or more intermediate phases, wherein components (A) and (B) combined are present in the composition in an amount of from about 55 to about 90 percent by weight, based on the total weight of components (A), (B) and (C); and wherein the ratio by weight of component (A) to component (B) is from about 1:5 to about 8:1.

DESCRIPTION OF THE INVENTION

Thermoplastic polyester elastomers useful in this invention are segmented copolymers comprised of a multiplicity of recurring long chain ester units, i.e., "soft segments", and short chain ester units, i.e., "hard segments", joined head to tail through ester linkages.

The term "long chain ester units", as applied to units in the polymer chain of the thermoplastic copolyester elastomers, refers to the reaction product of a long chain glycol with a dicarboxylic acid. The long chain glycols are polymeric glycols having terminal (or as nearly terminal as possible) hydroxy groups and a molecular weight above about 400 and, preferably, from about 600 to about 6000. The long chain glycols used to prepare the copolyesters are generally poly(oxyalkylene) glycols or glycol esters of poly(oxyalkylene) glycols and dicarboxylic acids.

The term "short chain ester units" as applied to units in the polymer chain refers to low molecular weight compounds or polymer chain units typically having molecular weights less than about 550. They are made by reacting a low molecular weight diol (molecular weight below about 250) with a dicarboxylic acid.

The term "dicarboxylic acid" as used herein is intended to include the condensation polymerization equivalents of dicarboxylic acids, i.e., their esters or ester forming derivatives, such as acid chlorides, anhydrides, or other derivatives which behave substantially like dicarboxylic acids in a polymerization reaction with a glycol.

The copolyester elastomers used in this invention are prepared by polymerizing with each other (a) one or more dicarboxylic acids or their equivalents, (b) one or more long-chain glycols, and (c) one or more low molecular weight diols. The polymerization reaction can be conducted by conventional procedures as, for example, in bulk or in a solvent medium which dissolves one or more of the monomers.

The dicarboxylic acids used in making the copolyester elastomers have molecular weights less than about 300. They can be aromatic, aliphatic or cycloaliphatic. These dicarboxylic acids can contain any substituent groups which do not interfere with the polymerization reaction. Examples of useful dicarboxylic acids are orthophthalic acid, isophthalic acid, terephthalic acid, bibenzoic acid, bis(p-carboxyphenyl)methane, p-oxy(p-carboxylphenyl)benzoic acid, ethylene bis(p-oxybenzoic acid), 1,5-naphthalene dicarboxylic acid, 2,7-naphthalene dicarboxylic acid, phenanthralene dicarboxylic acid, 4,4'-sulfonyl dibenzoic acid, and the like, as well as $C_1$–$C_{10}$ alkyl and other ring substituted derivatives thereof, such as halo, alkoxy or aryl derivatives. Hydroxy acids, such as p(β-hydroxyethoxy) benzoic acid, can also be used provided an aromatic dicarboxylic acid is also present.

Additional useful dicarboxylic acids are succinic acid, glutaric acid, adipic acid, pimelic acid, suberic acid, azelaic acid, sebacic acid, oxalic acid, fumaric acid, 1,3- or 1,4-cyclohexane dicarboxylic acid, 4-cyclohexene-1,2-dicarboxylic acid, 2,2,3,3-tetramethylsuccinic acid, and the like.

Preferred dicarboxylic acids are aromatic acids containing 8–16 carbon atoms, the cyclohexane-dicarboxylic acids and adipic acids. Particularly preferred dicarboxylic acids are terephthalic acid and isophthalic acid or mixtures thereof. Mixtures containing terephthalic acid and isophthalic acid wherein from about 1 to about 20 percent by weight of the mixture is isophthalic acid may be used when products of lower flexural modulus are desired.

The long chain glycols used in making the copolyester elastomers have molecular weights of about 400 to about 6000 and a carbon to oxygen ratio equal to or greater than 2. Useful long chain glycols include those derived from 1,2-alkylene oxides wherein the alkylene group contains 2 to about 10 carbon atoms, examples of which are ethylene oxide, 1,2-propylene oxide, 1,2-butylene oxide and 1,2-hexylene oxide. The useful long chain glycols are random or block copolymers of ethylene oxide and 1,2-propylene oxide. Preferred long chain glycols are poly (oxytetramethylene) glycols which are derived from tetrahydrofuran. A long chain glycol of particular interest is poly (oxytetramethylene) glycol having an average molecular weight of about 600 to about 4000.

Useful low molecular weight diols which react to form short chain ester units of the copolyester elastomers include such diols as ethylene glycol, propylene glycol, 1,4-butanediol, 1,4-butenediol, 1,6-hexamethylene glycol, dihydroxycyclohexane, cyclohexane dimethanol, resorcinol, hydroquinone, 1,5-dihydroxynaphthalene, bisphenol A and the like. Equivalent ester forming derivatives of diols, e.g., ethylene oxide or propylene carbonate, are also useful. Preferred diols are 1,4-butanediol, and 1,4-butenediol, or mixtures of the two. Such a preferred mixture is one wherein about 10 to about 40 weight percent, most preferably about 20 to about 30 weight percent, of the mixture is 1,4-butenediol.

Segmented copolyesters particularly well-suited for use in the practice of this invention are comprised of a multiplicity of recurring long chain ester units and short chain ester units joined head to tail through ester linkages, said long chain ester units being represented by the structure:

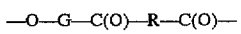

and the short chain ester units being represented by the structure:

wherein G is a divalent radical remaining after the removal of the terminal hydroxyl groups from at least one long chain polymeric glycol having a molecular weight of at least 600 and a melting point below about 55° C.; R is the divalent radical remaining after removal of carboxyl groups from an aromatic carboxylic acid independently selected from the group consisting of terephthalic acid, and mixtures of terephthalic acid and isophthalic acid; and D is the divalent radical remaining after removal of hydroxyl groups from at least one low molecular weight diol comprising at least 65 percent by weight of 1,4-butanediol, wherein said short chain segments amount to between about 25 and about 95 percent by weight of the copolyester and wherein about 50 to about 100 percent of the short chain ester units are identical. Of particular interest are segmented copolyesters having short chain segments units derived from 1,4-butanediol and terephthalic acid and long chain segments derived from terephthalic acid and poly(oxytetramethylene) glycol having an average molecular weight of about 600 to about 4000.

In producing the polyesters of this invention, a single long chain glycol or a mixture of glycols can be used. The long chain glycols react with at least one low molecular weight diol and at least one dicarboxylic acid to form a thermoplastic polyester in which long and short chain ester units are connected head-to-tail through ester linkages.

Short chain ester units must contribute about 25 to about 95 percent of the copolyester elastomer, preferably about 30 to about 65 percent, and it is important that about 50 to about 100 percent of the total short chain ester units be identical, that is, be reaction product of a single low molecular weight diol and a single low molecular weight dicarboxylic acid. These units will normally be distributed statistically throughout the polymer backbone.

The composition and relative amounts of the long- and short-chain ester units of the polyester elastomer are selected to provide the polyester elastomers with Shore Hardness values (as determined by ASTM D2240) of at least about 30, preferably from about 35 to about 55 on the Shore "D" scale. For many applications, polyester elastomers having Shore D values of from about 35 to about 50 are of particular interest.

The polyester elastomers are prepared using well-known condensation polymerization such as are illustrated, for example, in U.S. Pat. Nos. 3,907,926; 4,405,749; and 4,520, 149. Typical condensation temperatures range from about 150° C. to about 260° C., with temperatures of from about 225° C. to about 260° C. oftentimes being preferred.

Polyester elastomers are commercially available, for example, from Hoechst Celanese Corporation under the tradename RITEFLEX, from E. I. Du Pont de Nemours and Company under the tradename HYTREL, and from General Electric Company under the tradename LOMOD.

Thermoplastic polyurethane elastomers suitable for use herein are prepared from (a) an organic diisocyanate, (b) a polyesterol or polyetherol (herein termed a "polyhydroxy compound" or "polyol"), and (c) a chain extending agent. TPUs are segmented block copolymers comprised of hard segments formed by the reaction of the organic diisocyanate and chain extender and soft segments formed from the polyesterol or polyetherol. The segments form hard and soft phases or domains. The soft phases are elastomeric at room temperature and down to about −70° C.; such phases give the polyurethane its high elongation and elastic recovery. The hard phases are crystalline at room temperature; such phases impart structural integrity and strength to the elastomer. In the practice of this invention it has been found that the addition of a TPU to a polyester elastomer/composite interpolymer blend increases the crystallization temperature of the blend with little or no adverse effect on the elastomeric properties thereof.

The preparative techniques for making TPUs are well known in the art and include both single or multiple step polymerizations. In a single step or "one-shot" polymerization, the diisocyanate, polyol and chain extending agent are combined and reacted, whereas in a multiple step process the polyol is first reacted with the diisocyanate to produce a prepolymer which is subsequently reacted with the chain extender to build molecular weight. Suitable preparative techniques are disclosed, for example, in U.S. Pat. Nos. 3,493,634; 3,642,964; 4,169,196; 4,202,957; and 4,665,126.

Organic diisocyanates useful in producing the elastomeric polyurethanes include aliphatic, cycloaliphatic and aromatic diisocyanates. Illustrative thereof are the following: hexamethylene diisocyanate, 2-methyl-1,5-pentamethylene diisocyanate, trans-cyclohexane-1,4-diisocyanate, 4,4'-, 2,4'- and 2,2'-dicyclohexylmethane diisocyanate, 1,4-benzene diisocyanate, 2,4- and 2,6-toluene diisocyanate, 4,4'-, 2,4'- and 2,2'- diphenylmethane diisocyanate, 3,3'-dimethyl-4,4'-biphenyl diisocyanate, 4,4'-, 2,4'-, and 2,2-diisocyanate-1,2-diphenylethane, 1,5-naphthalene diisocyanate, and the like, and mixtures thereof. Aromatic diisocyanates are preferred, with 4,4'-diphenylmethane diisocyanate being of particular interest.

The polyesterols and polyetherols used in the preparation of the subject TPUs have molecular weights of at least about 400, preferably from about 600 to about 3500, with polyols having molecular weights of from about 1000 to about 2000 being of particular interest.

The polyesterols are prepared by the reaction of $C_2$ to $C_{12}$ aromatic or aliphatic dicarboxylic acids (or their anhydrides) with a polyhydric, preferably dihydric, aliphatic alcohols. Representative dicarboxylic acids include, for example, succinic, glutaric, adipic, pimelic, suberic, azelaic, sebacic, phthalic, terephthalic, and isophthalic acids, and the like, and mixtures thereof. In the preparation of such polyesterols, the use of aliphatic dicarboxylic acids is preferred, with adipic acid being of particular interest.

Suitable polyhydric alcohols include $C_2$ to $C_{10}$ aliphatic diols such as, for example, ethylene glycol, 1,3-propylenediol, 1,4-butanediol, 1,6-hexanediol, 1,8-octanediol, 1,10-decanediol, 2,2-dimethylpropane-1,3-diol, and the like, and mixtures thereof. Of particular interest are mixtures of ethylene glycol and 1,4-butanediol. In addition to the above type of polyesterols there can also be used the polycaprolactone diols which are prepared by polymerizing the appropriate caprolactone with the appropriate difunctional initiator, such as an aliphatic diol as exemplified above or an alkanolamine such as ethanolamine, propanolamine, butanolamine, and the like. Such procedures and products are well-known in the art; see, for example,. U.S. Pat. No. 2,914,556. A particularly preferred polyesterol of this type is obtained by initiation of the polymerization of ε-caprolactone with 1,4-butanediol.

The polyetherols employed in the preparation of elastomeric polyurethanes include polyether glycols prepared by reacting ethylene oxide, propylene oxide, butylene oxide, or mixtures thereof with water or bifunctional initiators such as ethylene glycol, 1,2-propylene glycol, 1,3-propanediol, 1,4-butanediol, 2,3-butanediol, 1,5-pentanediol, 1,2-hexanediol, diethylene glycol, dipropylene glycol, and the like. Other polyether glycols of interest include poly(oxytetramethylene) glycols prepared by the polymerization of tetrahydrofuran.

Polyols of particular interest include ethanediol polyadipates; 1,4-butanediol polyadipates; ethanediol/1,4-butenediol polyadipates; 1,6-hexanediol/neopentyl glycol polyadipates; 1,6-hexanediol/1,4-butenediol polyadipates; polycaprolactone glycol; and poly(oxytetramethylene) glycol.

The chain extending agent is a low molecular weight compound that is capable of reaction with isocyanate groups and includes any of the conventional diols, diamines and alkanol amine extenders commonly employed in the art. Illustrative thereof are ethylene glycol, 1,4-butanediol, 1,6-hexanediol, diethylene glycol, hydroquinone bis(2-hydroxyethyl)ether, 1,4-dimethylol benzene, ethylenediamine, ethanolamine, diethanolamine, N-methyl dimethanol amine, and the like, and mixtures thereof. Polyfunctional compounds may also serve as chain extending agents, however, when present, such polyfunctional compound will typically comprise less than about 1% of the total weight of the chain extending agents. Preferred chain extending agents are 1,4-butanediol, 1,6-hexanediol and hydroquinone bis(2-hydroxyethyl)ether, with 1,4-butanediol and hydroquinone bis(2-hydroxyethyl)ether being of particular interest. If desired, small amounts, i.e., less than about 1% of the total weight thereof, of polyfunctional chain extending agent may also be present. In the preparation of the subject polyurethane elastomers, the use of 1,4-butanediol as a chain extending agent is of particular interest.

Irrespective of the preparative technique employed in the production of the subject TPUs, it is generally recommended that the ratio of isocyanate (NCO) groups to the isocyanate reactive groups (i.e., hydroxyl and amine groups) approximate 1:1. Typically, the ratio of NCO groups to isocyanate reactive groups will range from about 0.95:1.00 to about 1.10:1.00 with ratios of from about 1.02:1.00 to about 1.06:1.00 being preferred. A shortage of NCO groups may create difficulties in attaining desired molecular weights, whereas an overabundance of NCO groups can result in excessive cross-linking, and undesirable increases in polymer viscosity.

The Shore Hardness of the elastomeric polyurethanes (as determined by ASTM D2240) is determined by the relative amounts of the hard and soft segments and the choice of reactants from such segments are derived. Desirably, the elastomeric polyurethanes will have Shore Hardness values of at least about 75, preferably at least about 80 on the Shore "A" scale, with polyurethanes having Shore A Hardness values of between about 80 and 95 being of particular interest.

The TPUs may further contain antioxidants, lubricants, stabilizers, and other additives commonly used in conjunction with elastomeric polyurethanes. These additives may be incorporated at any appropriate stage of TPU preparation.

TPUs are commercially available, for example, from BASF Corporation under the tradename ELASTOLLAN, from B. F. Goodrich Company under the tradename ESTANE, and from Dow Chemical Company under the tradename PELLETHANE.

In general, the polyester elastomer and elastomeric polyurethane combined are present in the compositions of this invention in amounts of from about 55 to about 90 percent by weight, preferably from about 60 to about 85 percent by weight, based on the total weight of the polyester elastomer, elastomeric polyurethane and composite interpolymer components. The ratio, by weight, of the polyester elastomer to elastomeric polyurethane will typically range from about 1:5 to about 8:1, preferably from about 1:3 to about 8:1, depending upon the properties desired in the ultimate composition. In general, decreasing the amount of TPU relative to the polyester elastomer will tend to increase the Vicat temperature of the resulting composition. In the practice of this invention, the use of a polyester elastomer to polyurethane elastomer ratio of from about 1:2 to about 7:1 is frequently of particular interest.

Multiphase composite interpolymers useful in the practice of this invention are core-shell rubbers having an elastomeric first phase or core and a final rigid thermoplastic phase or shell. If desired, one or more intermediate phases or shells may also be present, e.g., an intermediate shell polymerized from about 70 to 100 percent by weight of styrene.

The first phase of the composite interpolymer may be formed from monomer systems capable of producing acrylate or butadiene polymers. One suitable acrylate polymer is prepared by the polymerization of a monomer system comprising about 75 to about 99.8% by weight of at least one $C_1$ to $C_8$ alkyl acrylate, 0.1 to 5% by weight of crosslinking monomer and 0.1 to 5% by weight of graftlinking monomer. Alkyl acrylates suitable for use in this monomer system include n-butyl acrylate, ethyl acrylate, 1,3-dibutylene diacrylate, and the like, with n-butyl acrylate being of particular interest.

The crosslinking monomer suitable for use in the production of such acrylate polymers is a polyethylenically unsaturated monomer having a plurality of addition polymerizable reactive groups, all of which polymerize at substantially the same rate of reaction. Suitable cross-linking monomers include polyacrylic and methacrylic esters of polyols such as butylene diacrylate, butylene dimethacrylate, and the like; di- and trivinyl benzene, vinyl acrylate and methacrylate and the like; with butylene diacrylate being of particular interest as a crosslinking monomer.

The graftlinking monomer is a polyethylenically unsaturated monomer having a plurality of addition polymerizable reactive groups, wherein at least one of such groups polymerizes at a substantially different rate of polymerization from at least one other of said reactive groups. The function of the graftlinking monomer is to provide a residual level of unsaturation in the elastomeric phase, particularly in the latter stages of polymerization and consequently, at or near the surface of the elastomeric particles. When the rigid thermoplastic phase is subsequently polymerized at the surface of the elastomer, the residual unsaturated addition polymerizable reactive groups contributed by the graftlinking monomer participate in the subsequent reaction so that at least a portion of the rigid thermoplastic phase is chemically attached to the surface of the elastomer. Among the effective graftlinking monomers are allyl group-containing monomers such as allyl esters of ethylenically unsaturated acids, e.g., allyl acrylate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

Illustrative of a monomer system capable of producing a butadiene elastomer first phase is a system comprising at least 50 percent by weight butadiene and 0 to 50 percent by weight of one or more ethylenically unsaturated comonomers. Suitable ethylenically unsaturated comonomers used in the production of a butadiene first phase are ethylenically unsaturated monomers such as styrene, isoprene, acrylonitrile, and the like. The nature of butadiene polymerizations is such that the resulting polymers contains sites of unsaturation and may be crosslinked in accordance with techniques well-known in the art. Crosslinking assists in obtaining and maintain elasticity. Even after crosslinking, these polymers ordinarily will contain sufficient unsaturation to enable them to be graftlinked to the rigid thermoplastic phase.

The final phase is polymerized from one or more monomers selected from the group consisting of $C_1$ to $C_{16}$ alkyl methacrylates, styrene, acrylonitrile, alkyl acrylates, allyl methacrylate, diallyl methacrylate, and the like. Preferably at least 50 weight percent of the monomers from which the final phase is polymerized is a $C_1$ to $C_4$ alkyl acrylate.

Desirably, the elastomeric first phase constitutes from about 25 to about 95, preferably from about 60 to about 95 weight percent of the interpolymer. As noted above, the first phase is graftlinked to the outer rigid thermoplastic phase or shell, with one or more intermediate shells optionally being present. Interpolymers having a butadiene-based first phase tend to provide the compositions of this invention with better low temperature impact performance than interpolymers having an acrylate-based first phase. However, the properties exhibited will depend in part on the relative amounts and chemical composition of the other components present. Of particular interest in the practice of this invention are composite interpolymers comprising a first phase prepared from a monomer system comprising at least 50 weight percent of butadiene; a rigid final phase polymerized from a monomer system comprising methyl methacrylate and, optionally, an intermediate phase polymerized from a monomer system comprising styrene.

The composite interpolymers are prepared using conventional emulsion polymerization techniques such as are described, for example, in U.S. Pat. Nos. 4,200,567; 4,096,202; 4,180,494; and 4,200,567.

Composite interpolymers are commercially available, for example, from Rohm & Haas Company under the tradename PARALOID, from Elf Atochem under the tradename METABLEN, and from Kaneka Texas Corporation under the tradename KANE ACE.

In general, the interpolymer is present in the compositions of this invention in amounts of from about 10 to about 45 percent by weight, based on the total weight of the polyester elastomer, elastomeric urethane and composite interpolymer, with the composite interpolymer levels of preference being dictated by the property and processing requirements of individual applications. For many injection molding applications, elastomeric compositions wherein the composite interpolymer is present in an amount of from about 20 to about 40 percent by weight, based on the total weight of the polyester elastomer, elastomeric urethane and composite interpolymer components, are of particular interest. At composite interpolymer levels of less than about 15% by weight, the compositions will tend to lack the cold temperature impact strength of compositions having higher composite interpolymer levels. At composite interpolymer levels in excess of about 45 percent by weight, the melt viscosity of the resulting compositions may be increased to a degree which makes processing difficult.

The compositions of this invention can be prepared by conventional melt blending techniques wherein the polyester elastomer, thermoplastic polyurethane and composite interpolymer are combined under conditions of elevated temperature and shear. The order in which the components are combined is not critical; if desired, the various components can be combined in a single or multiple steps. Desirable melt blends are generally prepared by co-extrusion of the components at a temperature of up to about 230° C. For purposes of this invention, preferred melt temperatures are from about 190° to about 210° C. Depending upon the particular components utilized and their relative amounts, the use of melt temperatures in excess of 240° C. can result in severe degradation of the composition.

Depending on the objects being formed and the processing techniques employed, the compositions of this invention may further comprise one or more optional additives such as, for example, antioxidants, heat stabilizers, ultraviolet stabilizers, acid scavengers, mold release agents, lubricants, processing aids, flame retardants, pigments and the like. The total amount of such optional additives, excluding flame retardants, typically will not exceed about 5 percent of the total weight of the composition and oftentimes will not exceed about 3 percent of the total weight of the composition. Depending upon the particular additives, flame retardants may be present in amounts up to about 20 percent of the total weight of the composition. These optional additives may be incorporated by a variety of techniques which combines the additives with the melt blend in a substantially uniform manner; extrusion compounding being preferred. Additionally, for applications requiring greater stiffness, it may be desirable for the compositions to further comprise up to about 25 percent by weight of a compatible crystalline thermoplastic, for example, polyalkylene terephthalates, polycarbonates, and the like, provided, however, that the presence of such crystalline thermoplastics does not unacceptably affect the elastomeric properties of the composition.

The compositions of this invention are useful in the production of a variety of molded and extruded articles. Additionally, the compositions may be used as an overmolding or extrusion coating. Molded articles produced from the subject compositions may be subjected to other secondary processing steps such as, for example, painting, printing, laser marking, welding, bonding, and the like.

In an embodiment of particular interest, the elastomeric compositions of this invention consist essentially of:

(A) a segmented copolyester elastomer having a plurality of short chain segments and long chain segments connected head-to-tail through ester linkages, wherein said short chain segments are derived from 1,4-butanediol and terephthalic acid and said long chain segments are derived from terephthalic acid and poly(oxytetramethylene) glycol, wherein said short chain units comprise from about 30 to about 65 percent by weight of the copolyester elastomer, said copolyester elastomer having a Shore D value of from about 35 to about 50, more particularly from about 35 to about 45;

(B) an elastomeric polyurethane having a Shore A Hardness value of from about 80 to about 95, prepared by reacting a polyol prepared from ethylene glycol, 1,4-butanediol, and adipic acid and having a molecular weight of from about 600 to about 3500, more particularly from about 1000 to about 2000, with 1,4-butanediol and 4,4'-diphenylmethane diisocyanate; and (C) a composite interpolymer comprising a first phase prepared from a monomer system comprising at least 50 weight percent of butadiene; a rigid final phase polymerized from a monomer system comprising methyl methacrylate and, optionally, styrene; and, optionally, an intermediate phase polymerized from a monomer system comprising at least 70 weight percent styrene, wherein components (A) and (B) combined comprise from about 60 to about 85 percent by weight of the elastomeric composition, based on the total weight of components (A), (B) and (C) and wherein the weight ratio of component (A) to component (B) is from about 1:2 to about 7:1.

EXAMPLES

The following examples are presented to further illustrate this invention. The examples are not, however, intended to limit the invention in any way. The tests hereinafter described were performed on samples molded from compositions prepared in accordance with the examples. Unless otherwise indicated, all parts and percentages are by weight based on total composition weight.

Vicat temperature was measured according to ASTM D 1525. Crystallization temperature was measured by means of differential scanning calorimetry at a scanning rate of 20° C./min, on a Perkin-Elmer Model DSC7 unit. Flexural strength and modulus were measured pursuant to ASTM method D790. Izod impact (notched) was measured pursuant to ASTM method D256. Tensile strength and elongation were measured pursuant to ASTM method D638. The moldability ratings reported were based on visual observation; "poor" indicates extreme part sticking, whereas "good" indicates that parts were easily removed from the mold used to make parts for ASTM testing.

Materials used in the Examples set forth below are as follows:

Polyester Elastomer 1: Riteflex 640, a thermoplastic polyester elastomer from Hoechst Celanese Corporation having a Shore D Hardness of 40. The crystallization temperature of this material was measured as 93° C.

Polyester Elastomer 2: Riteflex 635, a thermoplastic polyester elastomer from Hoechst Celanese Corporation having a Shore D Hardness of 35.

TPU 1: Elastollan S-80A, a thermoplastic polyurethane elastomer from BASF Corporation having a Shore A Hardness of 78±2. The crystallization temperature of this material was measured as 67° C.

TPU 2: Elastollan S-85A, a thermoplastic polyurethane elastomer from BASF Corporation having a Shore A Hardness of 85±2.

TPU 3: Elastollan S-90A, a thermoplastic polyurethane elastomer from BASF Corporation having a Shore A Hardness of 92±2.

TPU 4: Elastollan S-95A, a thermoplastic polyurethane elastomer from BASF Corporation having a Shore A Hardness of 96±2.

TPU 5: Elastollan 1140, a thermplastic polyurethane elastomer from BASF Corporation.

TPU 6: Elastollan SP-852-55, a thermoplastic polyurethane elastomer from BASF Corporation.

Rubber 1: Paraloid EXL 3691, a butadiene/methylmethacrylate/styrene multiphase composite interpolymer from Rohm & Haas Co. DSC confirmed that this rubber was amorphous.

Rubber 2: Paraloid EXL 3330, a butylacrylate/methylmethacrylate multiphase composite interpolymer from Rohm & Haas Co.

Rubber 3: Kraton D 1102, a styrene-butadiene-styrene block copolymer from Shell Chemical Company.

Carbon Black Concentrate: a mixture of 25% by weight carbon black and 75% by weight of a polyester elastomer having a Shore D Hardness of 40.

Example 1

Compositions as described in Table 1 were compounded by mixing the components in the described proportions and melt blending the resulting mixtures on a twin screw extruder to produce an extrudate which was cooled and pelletized. Extrusion conditions were as follows:
melt temperature: 180° to 200° C.
die temperature: 200° C.
screw speed: 225 rpm
Vicat and crystallization temperatures of the compositions are given in Table 2.

Prior to molding the melt blends were dried overnight at 200° C. Conditions during molding were as follows:

melt temperature: 200° C.
mold temperature: 38° C.
cycle time: 60 sec
screw speed: 75 rpm Physical and thermal properties of the molded test samples are provided in Table 2.

Notwithstanding the presence of from 20.0 to 39.7 weight percent of an amorphous rubber, the compositions designated as $E_1$, $E_3$ and $E_4$ had significantly higher crystallization temperatures than the TPU and polyester elastomer components thereof; moreover, the range of crystallization temperatures of these compositions (126° C.–138° C.) was comparable to the range of crystallization temperatures (122° C.–137° C.) of the polyester elastomer/TPU blends designated as $C_3$ to $C_5$.

TABLE 1

| COMPONENT (weight %) | $E_1$ | $E_2$ | $E_3$ | $E_4$ | $C_1$ | $C_2$ | $E_5$ | $C_3$ | $C_4$ | $C_5$ |
|---|---|---|---|---|---|---|---|---|---|---|
| Polyester Elastomer 1 | 49.0 | | 47.0 | 68.7 | 46.7 | 52.7 | | 60.0 | 80.0 | 90.0 |
| Polyester Elastomer 2 | | 32.0 | | | | | 46.0 | 40.0 | 20.0 | 10.0 |
| TPU 1 | 10.0 | 25.0 | 25.0 | 10.0 | 20.0 | 11.0 | | | | |
| TPU 6 | | | | | | | 10.0 | | | |
| Rubber 1 | 39.7 | 39.7 | 24.7 | 20.0 | | | | | | |
| Rubber 2 | | | | | | | 39.7 | | | |
| Rubber 3 | | | | | 32.0 | 36.0 | | | | |
| Antioxidant | 0.3 | 0.3 | 0.3 | 0.3 | 0.3 | 0.3 | 0.3 | | | |
| Carbon Black Concentrate | | 2.0 | 2.0 | | | | 3.0 | | | |
| Nylon 6/6, 6/6, 10 terpolymer | 1.0 | 1.0 | 1.0 | 1.0 | 1.0 | 1.0 | 1.0 | | | |

The pelletized melt blends were molded on an Arburg injection molding machine into test specimens 3.2 mm thick.

TABLE 2

| Composition | $T_c$ (°C.) | Vicat Temp (°C.) | Melt Index (gm/10 min.) | Moldability rating | Tensile strength (M Pa) | Elongation at break (%) | Flex Strength (M Pa) | Flex Modulus (M Pa) | Notched Izod @ −40° C. (J/M) |
|---|---|---|---|---|---|---|---|---|---|
| $C_1$ | | | | poor | | | | | |
| $C_2$ | | | | poor | | | | | |
| $E_1$ | 126 | | 7.0 | good | 10.1 | no break | 3.7 | 81.7 | no break |
| $E_2$ | 138 | 70 | 4.9 | good | 11.9 | no break | 3.6 | 78.8 | no break |
| $E_3$ | 132 | 93 | 15.8 | good | 11.7 | no break | 2.6 | 77.2 | 20 to no break |
| $E_4$ | 138 | | | good | | | | | |
| $E_5$ | | | 4.3 | good | 12.4 | no break | 4.6 | 81.7 | no break |
| $C_3$ | 122 | | | | | | | | |
| $C_4$ | 135 | | | | | | | | |
| $C_5$ | 137 | | | | | | | | |

Example 2

Compositions as set forth in Table 3 were prepared and molded as described in Example 1. Vicat and crystallization temperatures of the compositions and physical properties of the molded test bars are provided in Table 4.

TABLE 3

| COMPONENT (weight %) | $E_6$ | $E_7$ | $E_8$ | $E_9$ | $E_{10}$ |
| --- | --- | --- | --- | --- | --- |
| Polyester Elastomer 1 | 47.0 | 42.0 | 37.0 | 30.0 | 22.0 |
| TPU 1 | 15.0 | 20.0 | 25.0 | 32.0 | 40.0 |
| Rubber 1 | 34.7 | 34.7 | 34.7 | 34.7 | 34.7 |
| Antioxidant | 0.3 | 0.3 | 0.3 | 0.3 | 0.3 |
| Nylon 6/6, 6/6, 10 terpolymer | 1.0 | 1.0 | 1.0 | 1.0 | 1.0 |
| Carbon Black Concentrate | 2.0 | 2.0 | 2.0 | 2.0 | 2.0 |

TABLE 4

| Composition | $T_c$ (°C.) | Vicat Temp (°C.) | Melt Index (gm/10 min.) | Tensile Strength (MPa) | Elongation at break (%) | Flex Modulus (MPa) | Notched Izod @ −40° C. |
| --- | --- | --- | --- | --- | --- | --- | --- |
| $E_6$ | 131 | 79 | 3.7 | 12.5 | no break | 75.1 | no break |
| $E_7$ | 130 | 75 | 2.9 | 12.2 | no break | 75.1 | no break |
| $E_8$ | 130 | 72 | 7.4 | 11.7 | no break | 69.2 | no break |
| $E_9$ | 129 | 68 | 6.7 | 11.2 | no break | 64.5 | no break |
| $E_{10}$ | 131 | 65 | 6.8 | 10.4 | no break | 60.6 | no break |

Example 3

Compositions as set forth in Table 5 were prepared and molded as described in Example 1. Vicat and crystallization temperatures of the compositions and physical properties of the molded test bars are provided in Table 6.

TABLE 5

| COMPONENT (weight %) | $E_{11}$ | $E_{12}$ | $E_{13}$ | $E_{14}$ | $E_{15}$ |
| --- | --- | --- | --- | --- | --- |
| Polyester Elastomer 1 | 37.0 | 37.0 | 37.0 | 37.0 | 32.0 |
| TPU 1 | 25.0 | — | — | — | — |
| TPU 2 | — | 25.0 | — | — | — |
| TPU 3 | — | — | 25.0 | — | — |
| TPU 4 | — | — | — | 25.0 | — |
| TPU 5 | — | — | — | — | 25.0 |
| Rubber 1 | 34.7 | 34.7 | 34.7 | 34.7 | 34.7 |
| Antioxidant | 0.3 | 0.3 | 0.3 | 0.3 | 0.3 |
| Nylon 6/6, 6/6, 10 terpolymer | 1.0 | 1.0 | 1.0 | 1.0 | 1.0 |
| Carbon Black Concentrate | 2.0 | 2.0 | 2.0 | 2.0 | 2.0 |

TABLE 6

| Composition | $T_c$ (°C.) | Vicat Temp (°C.) | Melt Index (gm/10 min.) | Tensile Strength (MPa) | Elongation at break (%) | Flex Modulus (MPa) | Notched Izod @ −40° C. |
| --- | --- | --- | --- | --- | --- | --- | --- |
| $E_{11}$ | 131 | 71 | 6.3 | 9.9 | no break | 72.6 | no break |
| $E_{12}$ | 131 | 74 | 6.1 | 10.5 | no break | 71.6 | no break |
| $E_{13}$ | 130 | 84 | 4.2 | 11.4 | no break | 73.2 | no break |
| $E_{14}$ | 131* | 93 | 3.8 | 9.0 | no break | 72.7 | no break |
| $E_{15}$ | 131 | 78 | 2.5 | 11.3 | no break | 73.6 | no break |

*A small second peak at 165° C. was noted in the DSC plot of this composition.

What is claimed is:

1. An elastomeric composition comprising:

(A) a polyester elastomer;

(B) a thermoplastic polyurethane elastomer; and (C) a multiphase composite interpolymer comprising an elastomeric first phase, a final rigid thermoplastic phase and, optionally, one or more intermediate phases, wherein components (A) and (B) combined are present in the composition in an amount of from about 55 to about 90 percent by weight, based on the total weight of components (A), (B) and (C); and wherein the ratio by weight of component (A) to component (B) is from about 1:5 to about 8:1.

2. The elastomeric composition of claim 1 wherein the polyester elastomer is a segmented copolymer comprised of a multiplicity of recurring long chain ester units and short chain ester units joined head to tail through ester linkages, wherein said short chain ester units comprise from about 25 to about 95 percent by weight of the polyester elastomer.

3. The elastomeric composition of claim 2 wherein said long chain ester units of the polyester elastomer are derived from an aromatic dicarboxylic acid and a polyalkylene glycol and wherein said short chain ester units of the polyester elastomer are derived from an aromatic dicarboxylic acid and a low molecular weight diol.

4. The elastomeric composition of claim 3 wherein said polyester elastomer comprises long chain ester units derived from terephthalic acid and poly(oxytetramethylene) glycol and short chain ester units derived from terephthalic acid and 1,4-butanediol.

5. The elastomeric composition of claim 1 wherein the polyester elastomer is a segmented copolyester comprised of a multiplicity of recurring long chain ester units and short chain ester units joined head to tail through ester linkages, said long chain ester units being represented by the structure:

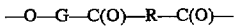

—O—G—C(O)—R—C(O)— and the short chain ester units being represented by the structure:

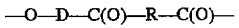

—O—D—C(O)—R—C(O)— wherein G is a divalent radical remaining after the removal of the terminal hydroxyl groups from at least one long chain polymeric glycol having a molecular weight above about 400 and a melting point below about 55° C.; R is the divalent radical remaining after removal of carboxyl groups from an aromatic carboxylic acid independently selected from the group consisting of terephthalic acid, and mixtures of terephthalic acid and isophthalic acid; and D is the divalent radical remaining after removal of hydroxyl groups from at least one low molecular weight diol comprising at least about 65 percent by weight of 1,4-butanediol, wherein said short chain segments amount to between about 25 and about 95 percent by weight of the copolyester and wherein about 50 to about 100 percent of the short chain ester units are identical.

6. The elastomeric composition of claim 3 wherein the thermoplastic polyurethane elastomer is a segmented block copolymer prepared by the reaction of:

(i) an organic diisocyanate with (ii) a polyhydroxy compound having a molecular weight of from at least about 400 and (iii) a chain extending agent wherein the ratio of NCO groups of the organic diisocyanate (i) to the total number of isocyanate reactive groups of components (ii) and (iii) is from about 0.95:1.00 to about 1.10:1.00.

7. The elastomeric composition of claim 6 wherein the thermoplastic polyurethane elastomer has a Shore A hardness value of at least about 75.

8. The elastomeric composition of claim 7 wherein the polyhydroxy compound from which the thermoplastic polyurethane elastomer is prepared is selected from the group consisting of polyetherols and polyesterols.

9. The elastomeric composition of claim 7 wherein the polyhydroxy compound from which the thermoplastic polyurethane elastomer is prepared is a polyesterol selected from the group consisting of ethane diol polyadipates, 1,4-butanediol polyadipates, ethanediol/1,4-butanediol polyadipates, 1,6-hexanediol/neopentyl glycol polyadipates, 1,6-hexanediol/1,4-butane diol polyadipates, polycaprolactones, and poly(oxytetramethylene) glycols.

10. The elastomeric composition of claim 7 wherein the polyhydroxy compound from which the thermoplastic polyurethane elastomer is prepared has a molecular weight of from about 400 to about 3500 and is derived from 1,4-butanediol, ethylene glycol and adipic acid; and the organic diisocyanate is selected from the group consisting of hexamethylene diisocyanate, 2-methyl-1,5-pentamethylene diisocyanate, trans-cyclohexane-1,4-diisocyanate, 4,4'-, 2,4'- and 2,2'-dicyclohexylmethane diisocyanate, 1,4-benzene diisocyanate, 2,4- and 2,6-toluene diisocyanate, 4,4'-, 2,4'- and 2,2'-diphenylmethane diisocyanate, 3,3'-dimethyl-4,4'-biphenyl diisocyanate, 4,4'-, 2,4'-, and 2,2-diisocyanate-1,2-diphenylethane, 1,5-naphthalene diisocyanate, and the like, and mixtures thereof.

11. The elastomeric composition of claim 8 wherein the thermoplastic polyurethane elastomer polyester is prepared by the reaction of:

(a) an organic diisocyanate comprising at least 96% by weight of 4,4'-diphenylmethane diisocyanate, (b) an ethane diol/1,4-butane diol polyadipate having a molecular weight of from about 600 to about 3500, and (c) 1,4-butane diol.

12. The elastomeric composition of claim 6 wherein the composite interpolymer has an elastomeric first phase derived from a monomer system selected from the group consisting of:

(i) a monomer system comprising about 75 to about 99.8% by weight of at least one $C_1$ to $C_8$ alkyl acrylate, 0.1 to 5% by weight of crosslinking monomer and 0.1 to 5% by weight graftlinking monomer; and (ii) a monomer system comprising at least 50 percent by weight butadiene and 0 to 50 percent by weight of one or more ethylenically unsaturated comonomers.

13. The elastomeric composition of claim 12 wherein the final rigid phase is polymerized from one or more monomers selected from the group consisting of $C_1$ to $C_{16}$ alkyl methacrylates, styrene, acrylonitrile, alkyl acrylates, allyl methacrylate, diallyl methacrylate, and the like.

14. The elastomeric composition of claim 13 wherein the composite interpolymer further comprises at least one intermediate phase.

15. The elastomeric composition of claim 14 wherein the composite interpolymer further comprises an intermediate phase polymerized from a monomer system comprising from about 70 to about 100 percent by weight styrene.

16. The elastomeric composition of claim 6 wherein the composite interpolymer comprises a first phase polymerized from a monomer system comprising at least 50 percent by weight butadiene and 0 to 50 percent by weight of styrene; a final rigid outer phase polymerized from a monomer system comprising methyl methacrylate, and, optionally, styrene; and, optionally, an intermediate phase polymerized from a monomer system comprising styrene.

17. The elastomeric composition of claim 12 wherein components (A) and (B) combined comprise from about 60 to about 85 percent by weight of the composition, based on the total weight of components (A), (B) and (C).

18. The elastomeric composition of claim 17 wherein the ratio by weight of component (A) to (B) is from about 1:3 to about 8:1.

19. An elastomeric composition consisting essentially of:

(A) a segmented copolyester elastomer having a plurality of short chain segments and long chain segments connected head-to-tail through ester linkages, wherein said short chain segments are derived from 1,4-butanediol and terephthalic acid and said long chain segments are derived from terephthalic acid and poly (oxytetramethylene) glycol, wherein said short chain units comprise from about 30 to about 65 percent by weight of the copolyester elastomer, said copolyester elastomer having a Shore D Hardness value of from about 35 to about 50;

(B) an elastomeric polyurethane having a Shore A Hardness value of from about 80 to about 95, prepared by reacting a polyol prepared from ethylene glycol, 1,4-butanediol, and adipic acid and having a molecular weight of from about 1000 to about 2000 with 1,4-butanediol and 4,4'-diphenylmethane diisocyanate; and (C) a composite interpolymer comprising a first phase prepared from a monomer system comprising at least 50 weight percent of butadiene; a rigid final phase polymerized from a monomer system comprising methyl methacrylate and, optionally, styrene; and, optionally, one or more intermediate phases prepared from a monomer system comprising at least about 70 weight percent styrene, wherein components (A) and (B) combined comprise from about 60 to about 85 percent by weight of the elastomeric composition, based on the total weight of components (A), (B) and (C) and wherein the weight ratio of component (A) to component (B) is from about 1:2 to about 7:1.

20. A molded article prepared from the elastomeric composition of claim 1.

21. A molded article as described in claim 20 which is subjected to one or more secondary processing steps selected from the group consisting of painting, printing, laser marking, welding, bonding, and the like.

* * * * *